Feb. 6, 1951      S. W. HYATT      2,540,887
CABLE-ANCHORING AND TIGHTENING DEVICE
Filed Dec. 31, 1948
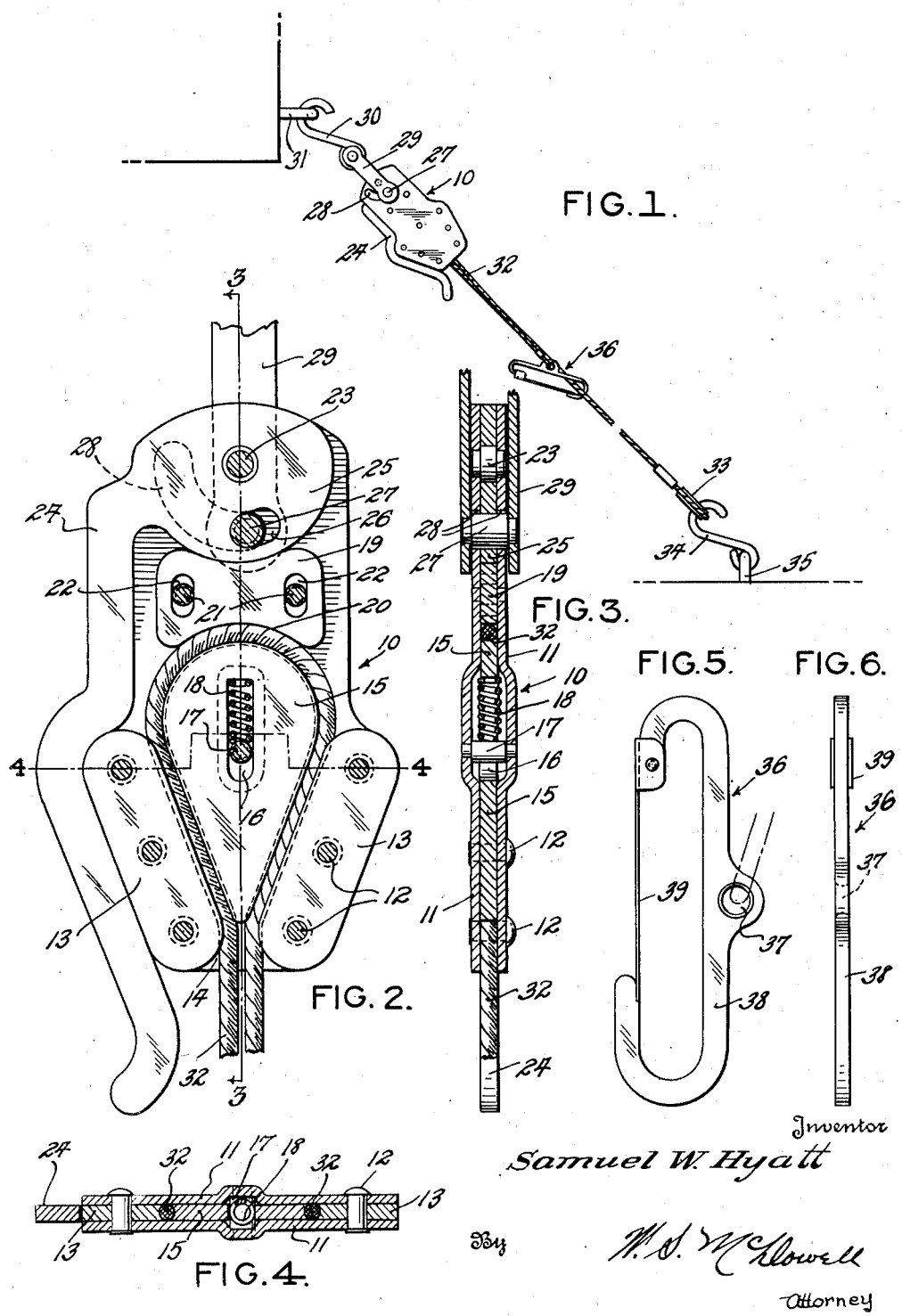
Inventor
Samuel W. Hyatt
By W. S. McDowell
Attorney Patented Feb. 6, 1951

2,540,887

UNITED STATES PATENT OFFICE 2,540,887

CABLE-ANCHORING AND -TIGHTENING DEVICE

Samuel W. Hyatt, Columbus, Ohio, assignor to D. L. Auld Company, Columbus, Ohio, a corporation of Ohio Application December 31, 1948, Serial No. 68,611

5 Claims. (Cl. 24—68)

This invention deals with anchoring and tightening devices for flexible cable, ropes, and the like, and more particularly with an improved apparatus operable to simultaneously anchor the free end of a flexible cable and to tighten the same throughout its length.

In its more specific aspects, the present invention contemplates an improved type of mooring or "tie-down" device for use in securing or anchoring aircraft in a fixed position upon a flying field or upon the deck of an aircraft carrier in a quick and facile manner. It should be understood, however, that the usage of the present improved cable anchoring apparatus is in no way restricted to the above mentioned use, the same being adapted for use in various capacities requiring a connecting link between a flexible cable and a stationary member, or between the free ends of two or more cables.

The primary object of the present invention is to provide an improved cable-anchoring device capable of fast and facile action in securely clamping the free end portion of a cable and simultaneously decreasing the effective length thereof with relation to a stationary object, whereby to tighten the connection between the cable and such an object.

It is another object of this invention to provide an anchoring device of this character which embodies a relatively small and compact casing in which is mounted a slidable wedge member about which the free end portion of a cable may be looped and subsequently clamped within the casing upon wedging action of the slidable member precipitated by movement of a single hand-operated lever which is also effective to move an associated connector link inwardly of the casing so as to decrease the effective overall length of the mooring or fastening device.

These and additional objects and advantages of the present invention will become more readily apparent by reference to the following description and the accompanying drawing, wherein:

Fig. 1 is an elevational view of the present mooring apparatus operatively connected between a stationary ground support and a relatively movable object, such as the wing of an airplane or the like;

Fig. 2 is a medial longitudinal vertical sectional view taken through the present cable-anchoring and tightening device;

Fig. 3 is a transverse vertical sectional view taken along the line 3—3 of Fig. 2;

Fig. 4 is a horizontal sectional view taken along the line 4—4 of Fig. 2;

Fig. 5 is a side elevational view of a combination handle and clip device which may be advantageously used in connection with the mooring apparatus of the present invention;

Fig. 6 is an edge elevational view of the combination handle and clip device.

Referring now to the drawing, the numeral 10 generally designates a casing which advantageously may comprise a pair of spaced complemental side plates 11 secured to one another by means of rivets or other suitable fastening devices, as at 12, and normally spaced from one another by the remaining operating elements making up the present invention, and to be hereinafter more fully described.

Disposed adjacent the lower end of the casing and separating the side plates thereof are a pair of relatively spaced and acutely angularly related blocks or abutments 13 which may constitute separable members with respect to the casing, or which may be formed integral therewith. The inner or adjacent edges of the blocks 13 define a tapered socket which opens at its smaller end at one end of the casing, as at 14.

Slidably mounted between the side plates 11 of the casing is a combination cable-receiving post and wedging member 15 which is formed with a centrally disposed slot 16 through which a spacer pin 17 extends, the latter being secured at its respective ends to the side walls 11 of the casing. The connection between the slidable cable-receiving post 15 and the casing 10 thus provides for limited longitudinal movement of the post into and out of the tapered socket defined by the blocks 13, and into and out of substantial wedging engagement with the inner edges of the blocks. Interposed between the pin 17 and one end of the slot 16 of the post is a coil compression spring 18 which resiliently urges the post out of wedging engagement with the inner surfaces or edges of the blocks 13. As shown particularly in Fig. 2, of the drawing, the post 15, in side elevation, is substantially cone-shaped with one end thereof being rounded through approximately 180°, while the side edges thereof are disposed in acutely angular relationship corresponding to the inner surfaces or edges of the blocks 13. Advantageously, the entire marginal edge portion of the post 15 may be arcuately grooved so as to provide a cable-receiving surface corresponding to the contour of a given size cable. By the same token, the inner edges of the blocks 13 are preferably arcuately grooved so as to conform to the curvature of a given size cable, and thereby provide an increased contacting surface between the cable, the blocks 13, and the post 15.

Slidably carried within the casing adjacent to the arcuately rounded portion of the post 15 is a sliding block 19 which has its side edges arcuately recessed, as at 20, in substantially concentric relation to the arcuately rounded portion of the post 15. The block 19 is connected with the casing 10 by means of a pair of pins or studs 21 which extend from either of the side walls 11 of the casing through slots 22 formed within the block whereby to provide for limited sliding movement of the block toward and away from the post member 15.

Pivotally mounted within the opposite end of the casing 10 between the side walls thereof, as by means of a pivot pin 23, is a hand-operated lever 24 which is mounted for swinging movement into substantially abutting relation to one of the sides of the casing 10. Toward this end, the lever 24 may advantageously be formed upon its inner surface so as to conform to the shape of the outer edge of the casing 10 whereby to lie in substantially flat compact relation thereto when occupying its position alongside the casing. The inner end of the lever 24 is formed so as to provide a substantially enlarged eccentrically disposed cam face 25 which, upon swinging movement of the lever 24, rides in sliding engagement with one of the arcuately recessed edges of the slidable block 19. The contour of the cam face 25 is such that upon swinging movement of the lever 24 to a position alongside of the casing 10, as shown in Fig. 2, the block 19 will be forced to its innermost position within the casing whereby to force the post member 15 into substantial wedging engagement with the inner edges of the blocks 13. Movement of the lever 24 in a clockwise direction, as viewed from Fig. 2, permits the block 19 to move upwardly within the casing and out of relative engagement with the post 15.

The cam portion of the lever 24 is also formed with a relatively short arcuate slot 26 through which extends a pin 27 which is slidably carried transversely of a relatively elongated arcuate slot 28 formed in and through the side walls 11 of the casing. Pivotally connected with the respective ends of the pin 27 are the ends of a bifurcated link 29 which normally extends outwardly from the opposite end of the casing, with its opposite end pivotally carrying a hook device 30 for attachment to a ring or bail 31, such as are normally carried upon the wing or tail portions of an aircraft.

The arcuate slot 28 formed within the side walls 11 of the casing has one of its ends terminating substantially at the outer end of the casing, and its opposite end terminating just beyond the center line of the casing below the pivot pin 23. Thus, as the lever 24 is swung in a counterclockwise direction, as viewed in Fig. 2, to its abutting position with respect to the edge of the casing, the pin 27 is forced from the outer to the inner end of the slot 28 to draw the link 29 inwardly of the casing, whereby to decrease the distance between the casing and the outer end of the link. Due to the location of the pin-receiving slot 26 with respect to the pivot pin 23, the pin 27 is moved to a past-center position, as shown in Fig. 2, when the lever 24 occupies its position alongside the casing 10. Thus, any force pulling outwardly upon the link 29 only serves to force the lever 24 into tighter abutting relation to the casing, thereby providing a past-center lock for the lever and its associated elements.

In operation, the free end portion 32 of a flexible cable or rope, having its opposite end 33 secured by suitable means such as a hook link 34 to a relatively stationary object 35, is directed inwardly through the opening 14 at the bottom of the casing 10, and in a counterclockwise direction, as shown in Fig. 2, around the marginal edges of the post 15, and back outwardly through the opening 14. With the lever 24 occupying an upward position with respect to the casing, the post member 15, under action of the spring 18, is held out of engagement with the inner edges of the blocks 13, and the slidable block 19 rides upwardly within the casing to provide clearance for the passage of the free end portion of the flexible cable. After insertion of the cable within the casing, around the post 15 and back outwardly through the opening 14, a combination handle and clip device 36, having a central connection opening 37, is connected to the free end of the cable to provide a convenient handle to pull upon the free end portion of the cable and thereby initially remove slack therefrom between the casing 10 and its ground support 35. After attachment of the hook member 30 to the object to be moored, and the removal of initial slack within the cable, the hand operated lever 24 is swung downwardly from its outward position with respect to the casing, to its position in abutting relation to the side thereof. During this swinging movement, the node portion of the cam face 25 engages the upper surface of the sliding block 19 and forces the same downwardly within the casing into engagement with the intermediate portion of the cable which is looped about the arcuately rounded end of the post 15. The length of the slot 26 formed in the cam portion of the lever 24 provides for the initial clamping of the slidable block against the cable just prior to initiating the inward movement of the link 29, whereby to prevent the cable from backing out of the casing. Further movement of the lever 24 forces the block 19 to its innermost position, and consequently forces the post 15 and the intermediate portion of the cable carried thereon into wedging engagement with the inner edges of the blocks 13, thus securely clamping a substantial portion of the looped segment of cable between the complemental wedging surfaces of the blocks 13 and the post 15. Simultaneously, with the clamping of the looped segment of the cable between the blocks 13 by the post 15, the link 29 is moved inwardly of the casing to substantially decrease the effective length of the overall mooring assembly, thereby removing any slack remaining within the cable.

When it is desired to release the mooring or "tie-down" assembly, the manually operated lever 24 is swung upwardly away from the casing 10 to simultaneously move the link 29 outwardly of the casing and release the pressure acting upon the slidable block 19 and the post member 15. Upon release of such pressure, the post member 15 is moved upwardly or inwardly of the casing, out of wedging engagement with the blocks 13, by action of the compression spring 18, thus allowing the cable to slide freely around the post member.

Figs. 5 and 6 of the drawing disclose in detail the combination handle and clip device 36 which is advantageously carried upon the free end portion of the cable of the present mooring apparatus, and which comprises a relatively elongated bail portion 38 which is bent backwardly at either end to provide a central opening for hooking engagement with the body portion of the flexible cable, as shown in Fig. 1, or with any suitable stationary object, to prevent dangling or free movement of the free end of the cable. Attached to one of the ends of the bail portion 38, and spanning the opening between such ends, is a resiliently flexible spring strip 39 which, in the normal manner, may be depressed to permit of the entrance of an associated connecting member, and which requires manual depression to release such connecting member.

In view of the foregoing, it will be seen that the present invention provides an improved mechanically efficient cable-anchoring and tightening device which is characterized by its quick and easy action in simultaneously clamping an associated flexible cable, and removing the slack therefrom when interposed between two relatively stationary objects or structures. Clamping devices formed in accordance with the present invention are further characterized by their compactness and relatively light weight, made possible through the simplicity and efficient arrangement of the working members of the device.

While a single preferred embodiment of the present invention has been disclosed in detail, it will be manifest that various modifications are comprehended without departing from the spirit of the invention or the scope of the following claims.

I claim:

1. A cable-tightening and anchoring device comprising an open-ended casing; a pair of spaced acutely angularly related abutments carried within said casing adjacent one end thereof and defining a tapered socket opening at one end of said casing; a post member slidably carried within said casing for relative wedging movement with respect to said abutments, said post member being formed along the marginal edge thereof with a surface for the looped reception of an intermediate portion of a flexible cable; means in said casing in engagement with said post member for resiliently urging the latter out of wedging engagement with said abutments; a block slidably carried within said casing adjacent said post member for movement into and out of engagement with a portion of a cable looped about said post member, said block being operable upon movement into engagement with a cable looped about said post member to move the cable and post member toward said abutments, whereby to clamp the cable between the marginal edge of said post member and said abutments, a hand-operated lever pivotally mounted in the opposite end of said casing and having a cam face in engagement with said block, said lever being operable upon swinging movement in one direction to move said block into engagement with a cable carried on said post member; and a connector link carried by said casing for limited reciprocating movement longitudinally thereof and connected with said lever, said link being movable toward the center of said casing in response to swinging movement of said lever in said one direction.

2. A cable-tightening and anchoring device comprising a hollow casing; means in said casing adjacent one end thereof defining an open-ended tapered socket having spaced acutely angularly related side walls and opening at said one end of said casing; a combination wedge and cable-receiving member slidably carried in said casing for movement into and out of substantial wedging engagement with the side walls of said socket; spring means connected with said cable-receiving member and resiliently urging the same out of wedging engagement with the side walls of said socket; a block slidably carried within said casing adjacent said cable-receiving member and movable in one direction to force said cable-receiving member into substantial wedging engagement with the side walls of said socket, whereby to clamp a cable looped about said member between the side walls of said socket and the edges of said cable-receiving member; a manually operable lever pivotally carried in the opposite end of said casing and having an eccentric cam face in engagement with said block, the cam face of said lever being operable in response to the swinging movement of said lever in one direction to slide said block in a direction to force said cable-receiving member into substantial wedging engagement with the side walls of said socket; and a connector link pivotally connected at one of its ends to said lever in offset relation to the pivotal connection between said lever and said casing, said link being connected with said lever so as to move toward the center of said casing upon swinging movement of said lever in a direction to cause relative engagement between said cable-receiving member and the side walls of said socket.

3. In a cable tightening and anchoring device; a hollow casing having an opening at one end for the introduction of the free end portion of a flexible cable and formed substantially at its opposite end with an arcuate slot, the slot of said casing having one end disposed closer to the center of said casing than the other end thereof; a pin carried within the slot of said casing for sliding movement from one end of the slot to the other; a connector link carried by said pin and extending outwardly from the said opposite end of said casing; means in said casing adjacent the cable-receiving opening thereof providing a pair of relatively spaced acutely angularly related walls; a substantially wedge-shaped cable-receiving member mounted within said casing for sliding movement into and out of substantial wedging engagement with said angularly related walls, the marginal edges of said cable-receiving member providing a surface around which the free end portion of a flexible cable may be looped and directed back out through the opening formed in the end of said casing, said member upon sliding movement in one direction serving to clamp a cable looped about the member between the marginal edge thereof and said angularly related walls; and means connected with said pin and engageable with a cable looped about said cable-receiving member for simultaneously sliding said pin to the end of said slot closest to the center of said casing and moving said cable-receiving member into substantially wedging engagement with said angularly related walls.

4. In a cable anchoring device; a hollow casing having an opening at one end thereof to receive an end of a flexible cable; a pair of angularly related blocks in said casing adjacent said opening; a cable-receiving post slidably mounted within said casing for movement into and out of substantial wedging engagement with said blocks and for the looped reception of a portion of a cable introduced within said casing by way of said opening; a connector link carried substantially at the opposite end of said casing for sliding movement toward and away from the center of said casing; and means connected with said link and engageable with a portion of a cable looped about said post operable to simultaneously slide said link toward the center of said casing and move said post and a cable carried thereby into wedging engagement with said blocks.

5. In a cable anchoring device; a casing having an opening at one end thereof to receive an end of a flexible cable; a plurality of stationary abutments in said casing; a cable-receiving sheave carried in said casing for movement into and out of substantial wedging engagement with said abutments and for the looped reception of a portion of a cable introduced within said casing; a connector link carried by and extending outwardly from the opposite end of said casing and movable inwardly and outwardly with respect to said casing; and means connected with said link and engageable with a portion of a cable looped about said sheave and operable to simultaneously move said link inwardly of said casing to decrease the outward extension thereof from the said opposite end of said casing and move said sheave and a cable looped thereabout into wedging engagement with said abutments.

SAMUEL W. HYATT.

REFERENCES CITED

The following references are of record in the file of this patent:

UNITED STATES PATENTS

| Number | Name | Date |
|---|---|---|
| 694,818 | Applegate | Mar. 4, 1902 |
| 1,793,140 | Steinmayer | Feb. 17, 1931 |
| 2,130,040 | Siler | Sept. 13, 1938 |
| 2,473,622 | Truswell | June 21, 1949 |

FOREIGN PATENTS

| Number | Country | Date |
|---|---|---|
| 586,108 | Germany | Oct. 16, 1933 |
| 789,052 | France | Oct. 22, 1935 |